United States Patent

[11] 3,630,360

| [72] | Inventors | Noah S. Davis<br>Northridge;<br>John B. Cramer, Palmdale; Wilbur A. Lester, Rolling Hills Estates, all of Calif. |
|---|---|---|
| [21] | Appl. No. | 814,305 |
| [22] | Filed | Apr. 8, 1969 |
| [45] | Patented | Dec. 28, 1971 |
| [73] | Assignee | North American Rockwell Corporation<br>El Segundo, Calif. |

[54] FILTERING SYSTEM FOR FINE SUSPENSIONS
2 Claims, 1 Drawing Fig.

[52] U.S. Cl. ..................................................... 210/82, 210/90, 210/406
[51] Int. Cl. ............................................. B01d 29/38
[50] Field of Search ........................................... 210/406, 411, 412, 19, 82, 90, 356, 391, 493, 499

[56] References Cited
UNITED STATES PATENTS

| 1,214,152 | 1/1917 | Genter ......................... | 210/412 X |
| 1,734,999 | 11/1929 | Cruickshank ................ | 210/411 X |
| 3,445,000 | 5/1969 | Litt .............................. | 210/406 X |
| 3,019,184 | 1/1962 | Brown .......................... | 210/82 |
| 3,032,868 | 5/1962 | Billner ......................... | 210/499 X |
| 3,394,803 | 7/1968 | Kaye ............................ | 210/499 X |

*Primary Examiner*—John Adee
*Attorneys*—L. Lee Humphries, Robert G. Rogers, Frederick Hamann and Joseph E. Kieninger ABSTRACT: A relatively fine mesh flexible filter is placed in a container filled with a suspension of fine solids in a liquid. The liquid is forced through the filter by a relatively low differential pressure, such as an open container and a vacuum source. Before the filter becomes completely clogged by the solids, a small backflow is induced through the filter by reversing the pressure differential across the filter. The reverse flow causes the filter to flex so that the relatively thin layer of material is removed simultaneously. When using a vacuum system, this can be obtained by breaking the vacuum above the container to allow the small hydraulic head to back flush the filter. When the vacuum source is reconnected, the filtering process is resumed. This cycle is repeated until all the liquid has been filtered. In certain applications, the filtrate is the desired product, in others the filter cake, and in still others both the cake and the filtrate are required.

PATENTED DEC 28 1971 3,630,360
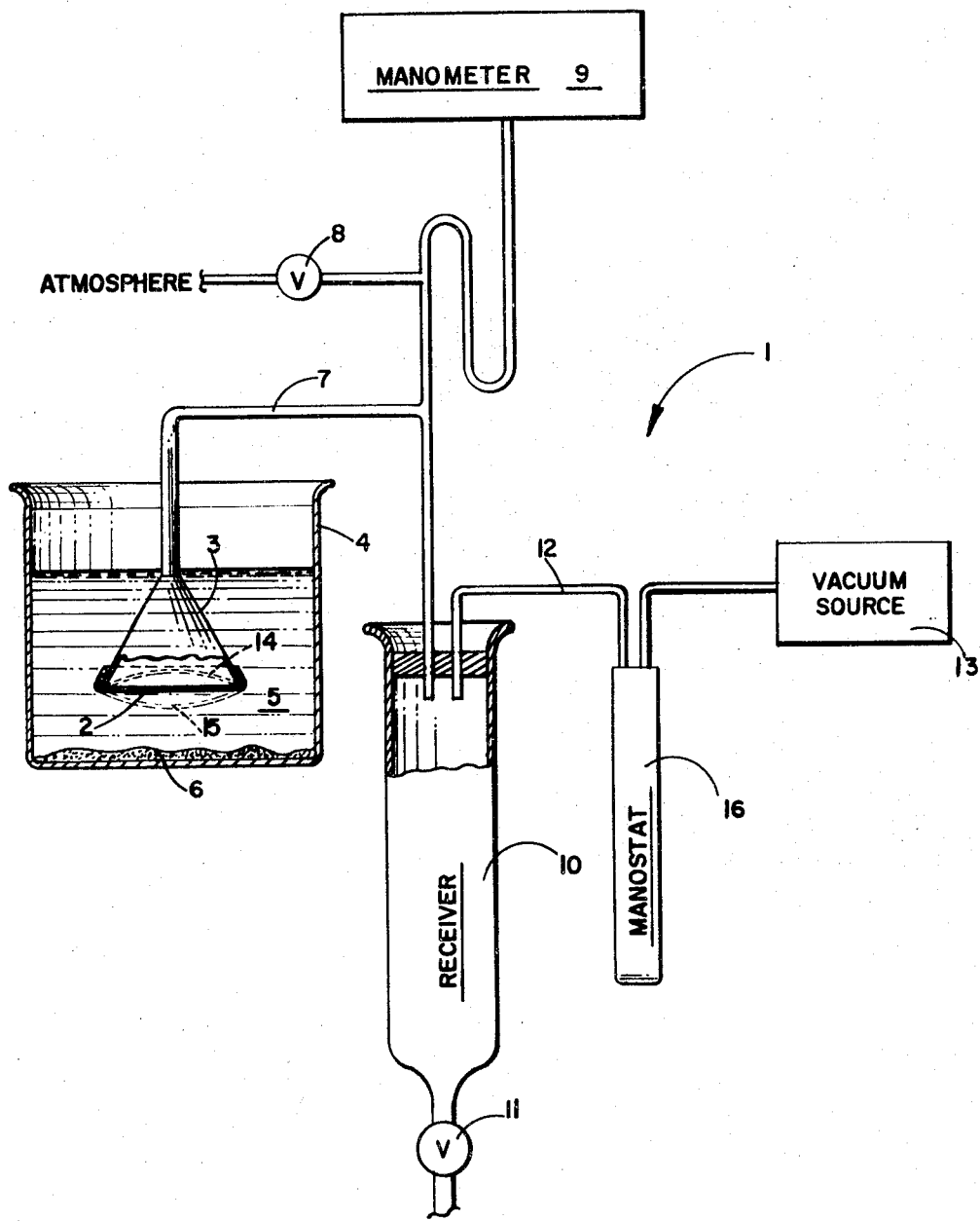
INVENTORS
NOAH S. DAVIS
JOHN B. CRAMER
BY WILBUR A. LESTER
Robert G. Rogers
ATTORNEY

FILTERING SYSTEM FOR FINE SUSPENSIONS

BACKGROUND OF THE INVENTION

1. Field of the Invention

The invention relates to a filtering system for fine suspensions that normally clog a filter and more particularly to such a filtering system in which a reverse flow of liquid is used at relatively short intervals to maintain a cleared filter.

2. Description of Prior Art

A filter is used to remove solid suspensions from liquids such as water so that either one or both the filtrate or the solid cake can be used. Many suspensions of solids in liquids are difficult to separate by filtration. The solids either pass through the smaller holes of the filter into the filtrate or clog the pores and quickly reduce the filtration rate to nil. Suspensions normally filtered include organic and inorganic materials in water or other liquid. Suspensions of biomass in water (mixtures of algae and other micro-organisms) are particularly difficult to filter.

The present invention provides a filtering system for removing suspensions of fine solids from liquids which overcomes the problems of existing filtering systems as indicated above.

SUMMARY OF INVENTION

Briefly, the invention comprises means for filtering fine suspensions of solids from liquids through a fine-mesh flexible filter at a pressure drop which is low enough to prevent pulling particles of the suspended solids into the openings of the filter. The invention also comprises means for reversing the flow of liquid through the filter at relatively short intervals to dislodge relatively thin layers of particles which have clogged the filter. The filter shape changes from concave to convex when reversing the fluid flow for effectively causing the relatively thin layer to be displaced from the filter as a single disc. As a result, the entire filter surface, instead of a relatively small area of the surface, is available for filtering after the filter has been cleared. In effect, the filter flexes when the relatively low pressure drop is reversed and the layer of filtered material snaps off. If a relatively high pressure drop had been maintained, the layer would have become relatively thick so that the snapping action would not be effective. Only by using a low pressure drop and a relatively flexible filter can the system be operated in a preferred manner.

Therefore, it is an object of this invention to provide an improved filtering system for separating fine suspensions of solids from liquids.

It is another object of this invention to provide an improved filtering system using a flexible filter having a relatively low pressure drop across the filter when filtering and in which the pressure is reversed at short intervals to dislodge the relatively thin filtered layer of material as a single disc.

It is another object of this invention to provide a filtering system for fine suspensions of solids in liquids using a pulsating and reversing liquid flow to maintain a cleared filter.

A still further object of the invention is to provide a relatively fine mesh filter which normally would clog in a filtering system for removing relatively fine solids from liquids, so that the residues and/or the liquids can be used for other purposes.

A still further object of the invention is to provide an improved filtering system for clearing suspended solids from large bodies of water.

A still further object of the invention is to provide a filtering system for producing a concentration of solids from a liquid including suspensions of the solids.

A further object of the invention is to provide an improved filtering system using a reverse pulse of filtered liquid to clear a clogged filter.

These and other objects of the invention will become more apparent when taken in connection with the description of the drawings, a brief description of which follows:

BRIEF DESCRIPTION OF THE DRAWINGS

The FIGURE is an illustration of one embodiment of the filtering system.

DESCRIPTION OF THE PREFERRED EMBODIMENTS

The FIGURE illustrates one embodiment of filtering system 1 comprising relatively fine mesh filter 2 secured to the opening of funnel 3, such as a glass funnel, inside a liquid container 4, such as a glass beaker partially filled with a liquid 5 which contains a suspension of solids. For the particular embodiment shown, residue 6 is shown at the bottom of the container 4.

Various types of filters may be used to implement filter 2. A particular filter must be selected as a function of the types of solids which are suspended in the liquids being filtered. For example, on fine suspensions where clogging usually occurs, a stainless steel screen of 200 × 1,150 mesh per inch may be used to filter a suspension of algae having a particular size of from 10 to 20 microns. It can also be used to filter fine suspensions of organic or inorganic material having a size of around 10–15 microns. A finer mesh would be required to filter suspensions having a size of less than this. For other suspensions, the filter may be implemented by other fine-mesh filters; metal, fabric, or plastic materials. The particle size of the suspended solids determines the mesh requirement of the filter. A filter ideally has openings, or pores, which are within the same size range as the particles being filtered.

The system further includes tubing 7 connecting the funnel 3 to valve 8. When valve 8 is opened, filter 2 is vented to the atmosphere. Tubing 7 is also connected to a vacuum gage (such as manometer 9 or to a bourdou tube).

A receiver 10, which may be a tube closed at one end by valve 11, is connected through tube 7 to filter 2. The vale 11 is opened at the end of a filtering operation to empty the filter. The receiver 10 is connected by tube 12 to a vacuum source 13 such as a vacuum pump. The vacuum may be regulated to a fixed low value by manostat 16, by a vacuum break or similar devices, well known by those skilled in the art.

During a filtering process, fine suspended solids tend to clog the filter and reduce the flow of liquid. Clogging is particularly a problem where the suspensions are relatively fine so that relatively fine pores are required. If a relatively high differential pressure across the filter were used, the solid particles would be pulled into the pores of the filter. In other words, instead of the particles forming on the surface of the filter in loose engagement with the filter, the particles become wedged in the openings. It is for that reason that a relatively low pressure drop should be maintained across the filter.

The filter 2 is cleared periodically by opening valve 8 to vent the back of the filter. As a result, the liquid in the tubing 7 flows in reverse through the filter into container 4. The particles on the surface of filter 2 are dislodged by the reverse flow to clear the filter. At the pressure change there is a flexing of the filter face which tends to cause the thin cake to be displaced from the filter face as a single disc which settles away from the filter face. The dotted line 14 illustrates the concave form of the filter when the liquid is being pulled through the filter. Dotted line 15 illustrates the convex form of the filter when the liquid flow is reversed. In certain embodiments, the flexing of the filter may be less pronounced so that it does not adopt a concave pattern in response to a pressure drop. In that case, the outward flexing would also be less pronounced.

It should be obvious that the means for producing the reverse pulse of liquid for clearing the filter is not limited to the particular means shown, the reverse pulse could be induced by pneumatic or by mechanical means not shown. In addition, instead of a liquid pulse, a gas pulse could be introduced into tubing 7 by opening valve 8. The gas pulse would pass through the filter in the reverse direction to remove the solids from the face of the filter.

After the brief interval required for clearing the filter, valve 8 is closed and the filtering process is resumed. During a complete filtering cycle, the vacuum to the filter must be periodically opened to clear the filter pores. The period between clearing intervals is a function of the size of the suspended particles, the filter, and the vacuum in tube 7. If the vacuum is increased, the rate of flow of liquid per unit of filter area is increased and the clogging occurs more frequently.

However, there is a limit on the amount of differential pressure because eventually the particles can be driven into the filter so tightly that the backflowing (reverse pressure drop) will no longer clear the filter.

It is pointed out that the filter need not be suspended vertically as shown in the figure. It could be disposed in a horizontal direction or at any angle depending on the specific requirement of a system.

Although the system has been used to filter various types of solids suspended in liquids the following examples are offered as specific illustrations of the operation of the system.

EXAMPLE I

1. A container was filled with a suspension of Scenedesmus (algae) in water having a concentration of 500 to 600 parts per million.
2. A manostat was set to limit the vacuum pressure to 2½ inches of mercury.
3. A stainless steel screen (200 × 1,150 mesh per inch) was sealed to the lip of a glass funnel by an epoxy resin. Afterwards, the filter was placed inside the container. The filter was connected to the other parts of the system by rubber tubing and glass tees.
4. A vacuum pump was turned on to initiate the filtering process.
5. The rate of flow of the liquid into a receiver was observed. When the flow rate decreased, a valve was opened to permit the small volume of liquid held in the tube above the filter to flow in the reverse direction through the filter to clear the Scenedesmus which was clogging the filter pores. The Scenedesmus disc which had formed on the filter surface sank to the bottom of the container as a residue disc. Afterwards, the valve was closed and the cycle repeated. For the particular process, it was necessary to clear the filter every 15 to 20 seconds.
6. At the end of the filter cycle, the residue was analyzed and found to be approximately 16 to 19 percent solid. The concentration of the solid could have been increased by further processing of the residue by mechanical, thermal, or other means well known in the art. For example, the residue could have been subjected to temperature to cause further evaporation of the liquid from the solid material.

It was found that the system could be used to remove algae from water at a relatively high rate. One operation resulted in a 99 percent reduction in the algae count in water with a flow rate of three-fourths of a gallon per minute per square foot of filter area.

The following examples illustrate the application of the system to another biomass suspension (example II), an inorganic suspension (example III), an organic suspension (example IV).

EXAMPLE II

A 90-millimeter diameter filter was placed in a suspension of algae in water having a cell count of 1,650,000 cells per ml. On a normal vacuum filtration, the filter (200 × 1,150 mesh) plugged within 2 to 3 minutes. However, using a pulsating flow obtained with a 6-inch vacuum every half minute, a flow rate of 139 ml. per minute was obtained. This filtrate was quite clear containing only 11,250 cells per millimeter. It was suitable for sand filtration to obtain sparkling clear water. This algae suspension contained the following species 72 percent Chodatella, 24 percent Chlorella, and 4 percent Scenedesmus.

EXAMPLE III

A 500 parts per million suspension of calcium oxide (an inorganic solid) was filtered by straight filtration. The first minute 228 ml. came through the filter. In the second minute 97 ml. came through the filter. When the filter was pulsed every 30 seconds, the first minute produced 452 ml. and the second 182, showing the advantage of greater flow with pulsing.

EXAMPLE IV

A 50,000 parts per million starch suspension (an organic solid) was filtered by straight filtration. The first minute produced 338 ml. of filtrate and the second 212 ml. With pulsation every 30 seconds, there was 404 ml. of filtrate the first minute and 325 ml. the second, again showing the advantage of the pulsating filter.

It is pointed out that filter systems, as shown in the figure, can be used with different sized filters in stages to sequentially remove different sized particles from a liquid. For that embodiment, the filter size would be decreased at each stage.

We claim:
1. A method of filtering liquids containing fine particle size solids comprising the steps of
    providing a flexible filtering means having a concave configuration under filtering conditions and a convex configuration under nonfiltering conditions,
    filtering said liquid by producing a pressure drop of the order of 2.5 to 6 inches mercury across said filtering means to form a relatively thin layer of solids on said filtering means, and
    reversing the pressure across said filtering means every of the order of 15 to 30 seconds to dislodge the relatively thin layer of solids from said filtering means.
2. A method of described in claim 1 whereby said filtering means has of the order of 200 × 1,150 mesh per inch.

* * * * *